March 10, 1931.  H. HEUSER  1,796,022
DEALCOHOLIZING ALCOHOLIC LIQUIDS
Filed Jan. 26, 1928  2 Sheets-Sheet 1
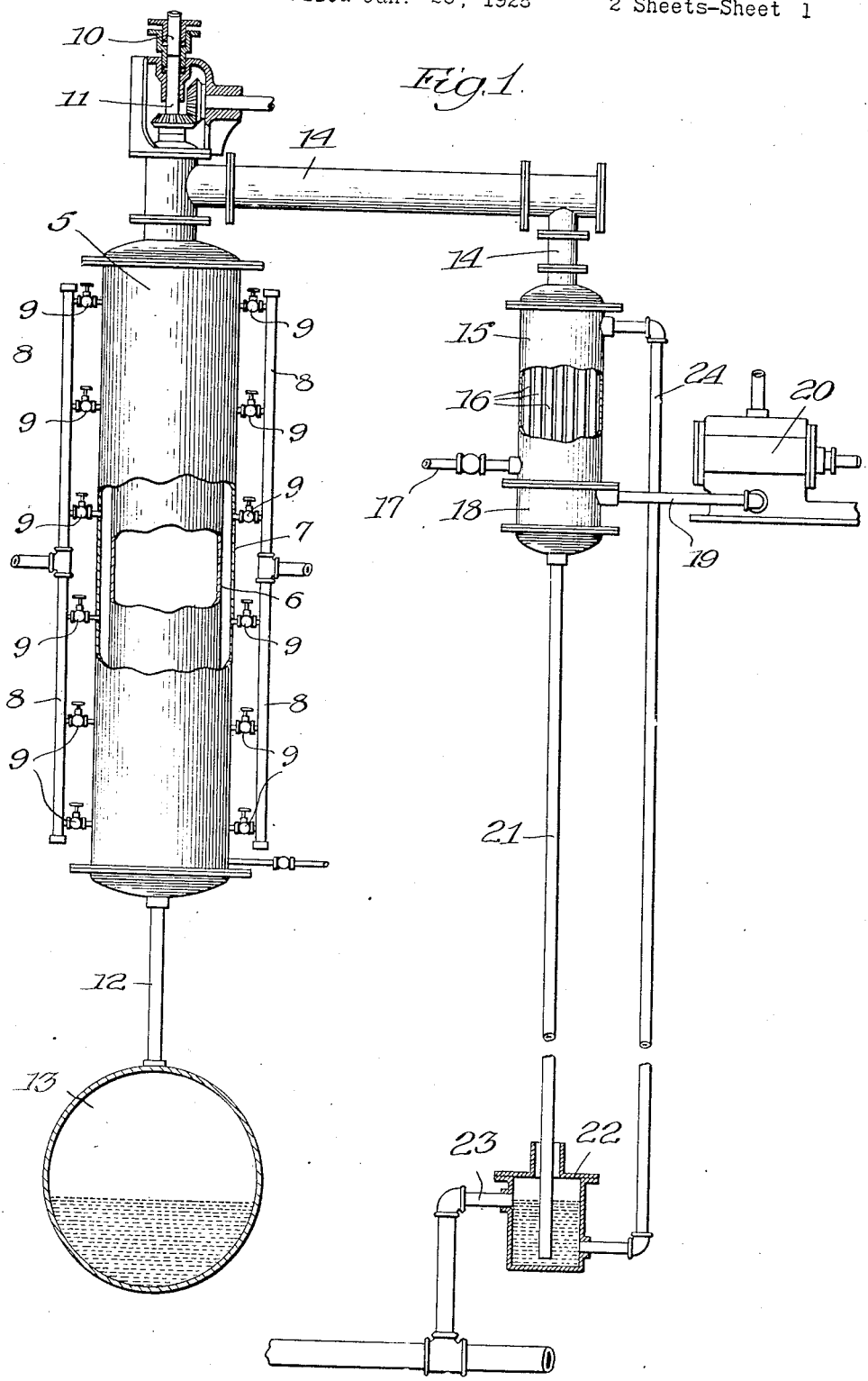

March 10, 1931.                H. HEUSER                1,796,022
                    DEALCOHOLIZING ALCOHOLIC LIQUIDS
                   Filed Jan. 26, 1928        2 Sheets-Sheet 2
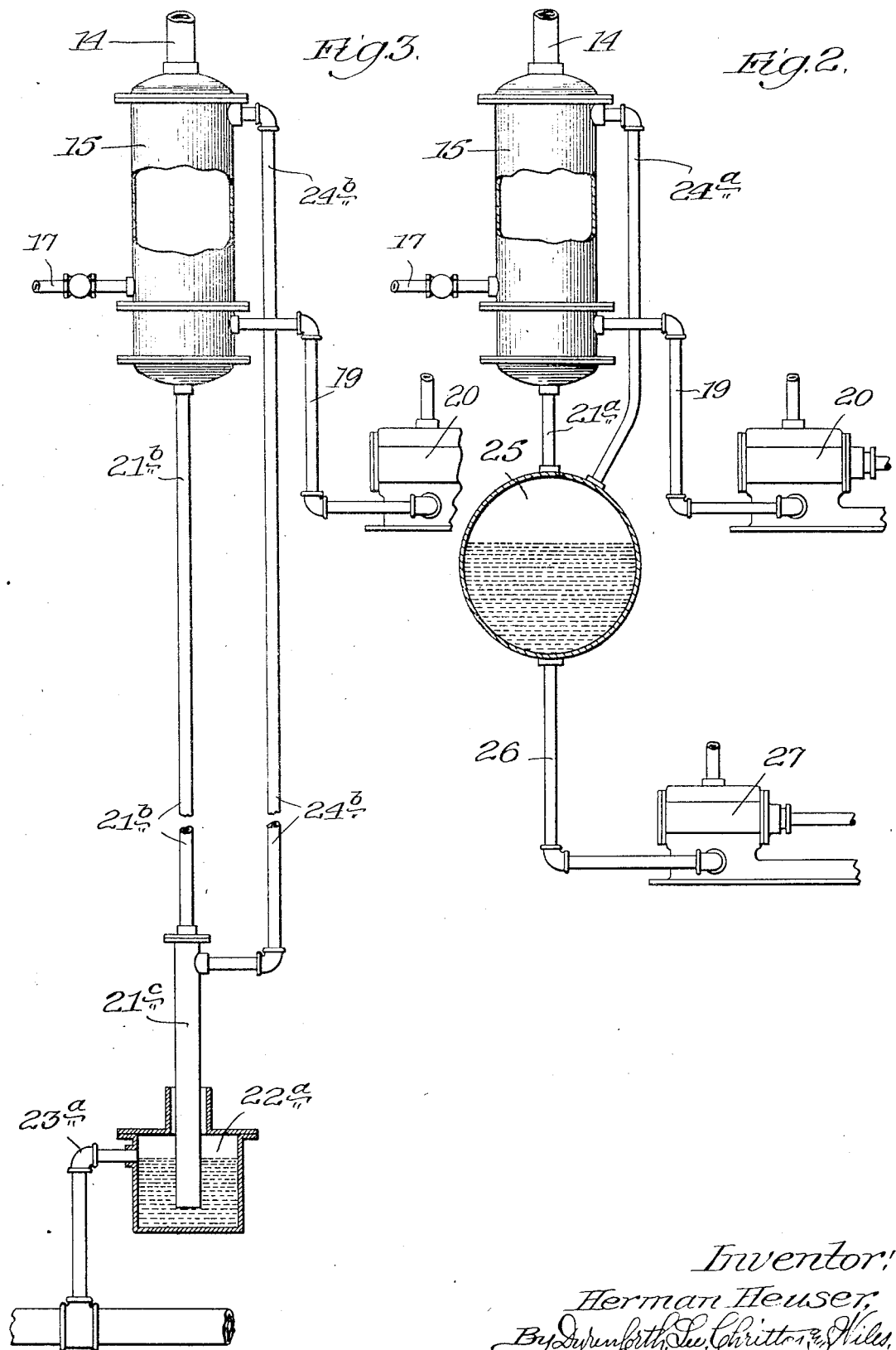
Inventor:
Herman Heuser,
By Dyrenforth, Lee, Chritton & Wiles,
Attys.

Patented Mar. 10, 1931

1,796,022

UNITED STATES PATENT OFFICE

HERMAN HEUSER, OF CHICAGO, ILLINOIS, ASSIGNOR TO UNITED STATES PROCESS CORPORATION, OF CHICAGO, ILLINOIS, A CORPORATION OF ILLINOIS

DEALCOHOLIZING ALCOHOLIC LIQUIDS

Application filed January 26, 1928. Serial No. 249,608.

The present invention relates to improvements in the dealcoholization of fermented beverages, and while generally applicable to such materials, it is described hereinafter more particularly as applied to fermented cereal beverages such as beers, ales and the like. It will be fully understood from the following description, illustrated by the accompanying drawings, in which:

Figure 1 illustrates, partly in section, apparatus suitable for carrying the invention into effect;

Fig. 2 illustrates a modified form of a portion of the apparatus of Fig. 1; and

Fig. 3 illustrates a second modified form of a portion of the apparatus of Fig. 1.

Referring more particularly to Fig. 1 of the drawings, the numeral 5 indicates an evaporator formed of an internal cylinder 6 surrounded by an external spaced cylinder 7, the space between the two cylinders forming a jacket for the admission of steam or other suitable heating medium. The heating medium, for example, steam is supplied to the jacket from the manifolds 8 by the valved pipes 9. The beverage stock to be treated is supplied to the evaporator 5 through the supply pipe 10 and the rotatable distributing pipe 11, by which the material is distributed over the upper end of the inner wall of the cylinder 6 in a flowing film, as illustrated, for example, in my Patent 1,500,618, granted July 8, 1924. Suitably distributed over the inner wall of the evaporator, the stock flows downwardly in a continuous film which is heated while a vacuum is preferably maintained within the evaporator as hereinafter described, and its alcohol together with its more easily vaporizable constituents driven off. The dealcoholized residue liquid discharges through the pipe 12 into the receiver 13, from which it may be withdrawn by any suitable means.

The vapors driven off from the evaporator pass out through the vapor conduit 14 into the tubular condenser 15, passing through the tubes 16 surrounded by a cooling space to which water is supplied by the valve controlled pipe 17. The cooling of the vapors is so controlled that the alcohol present therein is condensed in the tubes 16. The condensate, including the alcohol, and the cooled uncondensed vapors then enter the chamber 18 in the lower portion of the tubular condenser, from which the uncondensed cooled vapors are separately withdrawn through the pipe 19 leading to the intake of a dry vacuum pump 20, by which the desired vacuum, say 20 inches, may be secured. These vapors include, among other constituents, carbon dioxide originally dissolved in the beverage stock and the aroma-producing vapor substances which are of value for imparting a distinctive flavor and bouquet to the beverage material.

The alcoholic condensate from the chamber 18 in the base of the tubular condenser 15 is discharged through the tube or pipe 21, which, in the form shown in Fig. 1, is of sufficient length to permit the maintenance of a barometric column of the liquid. The lower end of the pipe 21 opens into a receptacle 22, open to the atmosphere, in which a body of liquid is maintained, overflowing through the pipe 23. The cooling water from the space in the tubular condenser surrounding the tubes 16 is continuously discharged through the pipe 24 and likewise enters the receptacle 22, continuously diluting the discharged condensate to an alcoholic concentration substantially below 0.5%. The liquid discharging through the pipe 23 is thus a diluted liquid, which may be freely handled or which may be discharged directly to the sewer.

By operating in the manner described, the alcohol secured from the evaporation of the beverage stock is dissipated under conditions fully complying with all legal requirements, and at the same time the valuable non-alcoholic constituents of the vapors are preserved and may be utilized, if desired, in improving the characteristics of the dealcoholized liquid, for example, as described in my co-pending application Serial No. 249,637, filed of even date herewith.

In Fig. 2 I have illustrated a modified form of my invention, in which the barometric column discharge from the condenser is dispensed with. Referring to Fig. 2, the numeral 15 indicates the tubular condenser receiving the vapors from the evaporator through the line 14. The cooling medium is supplied through the line 17 and discharged through the line 24ª to a receiver 25 which likewise receives the condensate discharged through the line 21ª. Cooled uncondensed vapors and gases, are, as in Fig. 1, withdrawn through the line 19 by the vacuum pump 20.

In the receiver 25 the condensate and used cooling medium are mixed, forming a diluted solution of satisfactorily low alcohol content, which is withdrawn through the pipe 26 by the pump 27 and discharged to any suitable point or wasted.

Fig. 3 illustrates a second modified form of operation of this invention, in which the water used for condensation is discharged into the barometric column itself instead of into the receiver at the lower end of the barometric column. In Fig. 3 the numeral 15 designates the tubular condenser receiving the vapors from the evaporator and discharging its condensate through the line 21ᵇ, the lower end of which is enlarged as at 21ᶜ. The cooling liquid supplied to the condenser through the line 17 is discharged through the line 24ᵈ which likewise enters the enlargement 21ᵉ at the base of the pipe 21ᵈ. The pipe 21ᶜ opens into the receptacle 22ª, in which a body of liquid is maintained, discharge being through the overflow pipe 23ª. The surface of the liquid in the receptacle 22ª is exposed to atmospheric pressure. The height of the column formed by the pipes 21ᵈ and 21ᶜ is sufficient to form a barometric discharge column for the liquid condensate and cooling water.

Although I have described my invention in connection with various specific details of apparatus for carrying it into effect, it is to be understood that these details are not to be regarded as limitations upon the scope of the invention, except in so far as included in the accompanying claims.

I claim:

1. In the method of dealcoholizing alcohol-containing liquids, and disposing of the removed alcohol, heating the alcohol-containing liquid to remove the alcohol in vapor form therefrom, passing the alcoholic vapors through a cooling zone in indirect conductive contact with aqueous cooling liquid, thereby condensing the alcoholic constituents of the vapors, separately removing the uncondensed constituents of the vapors, and combining the alcoholic condensate and the aqueous cooling liquid and discharging the combined liquid.

2. In the method of dealcoholizing alcoholic liquids and disposing of the alcohol derived therefrom, heating the alcoholic liquid to remove the alcohol therefrom in vapor form, passing the vapors to a cooling zone in indirect heat conductive contact with aqueous cooling medium, thereby condensing the alcohol from said vapors, separately exhausting the condensed portions of the vapors at a rate sufficient to maintain a pressure substantially below atmospheric upon the heating and condensing zones, combining the aqueous cooling medium and the alcoholic condensate and discharging the combined mixture at atmospheric pressure.

3. The method of dealcoholizing an alcoholic liquid and disposing of the alcoholic portion thereof which comprises passing the alcoholic liquid through a heating zone in which it is heated to remove the alcohol therefrom in vapor form, passing the alcoholic vapors through a cooling zone, cooling the vapors therein by indirect heat conductive contact with a continuously supplied aqueous cooling medium, thereby condensing the alcoholic constituents of said vapors, separately exhausting the uncondensed constituents of the vapors at a rate sufficient to maintain a pressure substantially below atmospheric upon the heating and condensing zones, discharging the alcoholic condensate through a barometric column while maintaining a body of liquid column at the base thereof, and supplying the aqueous cooling medium from the cooling zone to said body of liquid.

4. In apparatus for removing alcohol from alcoholic liquids and disposing of the removed alcohol, means for heating the liquid to remove the alcohol therefrom, a condenser, means for conveying alcoholic vapors from the heating means to the condenser, means for supplying a cooling medium in indirect heat conductive contact with the alcoholic vapors in the condenser, means for separately withdrawing uncondensed vapors from the condenser, and means for combining the condensate and cooling medium leaving the condenser.

5. In apparatus for removing alcohol from alcoholic liquids and disposing of the removed alcohol, an evaporator, means for supplying alcoholic liquid thereto, a condenser, means for conveying alcoholic vapors from the evaporator to the condenser, means for passing cooling liquid in indirect heat conductive contact with the alcoholic vapors in the condenser to condense the alcohol therefrom, means for exhausting uncondensed vapors from the condenser to maintain reduced pressure within the evaporator and condenser, means for combining the condensate and cooling medium discharged from the condenser, and means for discharging the combined condensate and cooling medium at atmospheric pressure.

6. In apparatus for removing alcohol from alcoholic liquids and disposing of the removed alcohol, an evaporator, means for supplying alcoholic liquid thereto, a condenser, means for conveying alcoholic vapors from the evaporator to the condenser, means for passing cooling liquid in indirect heat conductive contact with the alcoholic vapors in the condenser to condense the alcohol therefrom, means for exhausting uncondensed vapors from the condenser to maintain reduced pressure within the evaporator and condenser, a barometric discharge conduit for the condensate from the condenser, a receptacle into which said conduit opens, means for supplying cooling medium from the condenser to said receptacle, and means for discharging admixed condensate and cooling medium therefrom.

HERMAN HEUSER.